United States Patent
Raukola et al.

(10) Patent No.: US 7,434,543 B2
(45) Date of Patent: Oct. 14, 2008

(54) ARRANGEMENT IN RECOVERY BOILER

(75) Inventors: Antti Raukola, Kangasala (FI); Jussi Mäntyniemi, Ylöjärvi (FI)

(73) Assignee: Kvaerner Power Oy, Tampere (FI)

( * ) Notice: Subject to any disclaimer, the term of this patent is extended or adjusted under 35 U.S.C. 154(b) by 167 days.

(21) Appl. No.: 11/398,461

(22) Filed: Apr. 5, 2006

(65) Prior Publication Data

US 2006/0249098 A1   Nov. 9, 2006

(30) Foreign Application Priority Data

Apr. 25, 2005   (FI) ................................. 20055193

(51) Int. Cl.
*F22G 7/00*   (2006.01)

(52) U.S. Cl. ................... 122/7 R; 122/461; 122/467

(58) Field of Classification Search ................ 122/7 R, 122/460, 461, 467, 468, 474, 475, 477, 485
See application file for complete search history.

(56) References Cited

U.S. PATENT DOCUMENTS

| 1,992,953 | A | * | 3/1935 | Kerr | 122/235.11 |
|---|---|---|---|---|---|
| 2,161,110 | A | | 6/1939 | Tomlinson et al. | |
| 3,169,512 | A | | 2/1965 | Hochmuth | |
| 3,443,550 | A | * | 5/1969 | Kovacik et al. | 122/7 R |
| 4,014,296 | A | | 3/1977 | Astrom | |
| 5,299,534 | A | | 4/1994 | Janka | |
| 5,769,156 | A | | 6/1998 | Storbacka | |
| 5,787,844 | A | | 8/1998 | Paju | |
| 5,803,020 | A | * | 9/1998 | Palmgren | 122/7 R |
| 6,178,924 | B1 | * | 1/2001 | Hakulinen et al. | 122/7 R |
| 6,609,482 | B2 | * | 8/2003 | Ruohola et al. | 122/7 R |

FOREIGN PATENT DOCUMENTS

| EP | 0 254 379 | 1/1988 |
|---|---|---|
| EP | 1 416 083 | 5/2004 |
| GB | 885315 | 12/1961 |
| GB | 1 348 486 | 3/1974 |
| WO | 03/104547 | 12/2003 |

* cited by examiner

*Primary Examiner*—Gregory A Wilson
(74) *Attorney, Agent, or Firm*—Ladas & Parry LLP

(57) ABSTRACT

The invention relates to an arrangement in a recovery boiler, into which spent liquor to be combusted and combustion air are fed, the arrangement comprising superheaters in the upper part of the recovery boiler for recovering heat. Instead of screen tubes the invention is provided with a superheater formed of horizontal elements.

3 Claims, 2 Drawing Sheets

ARRANGEMENT IN RECOVERY BOILER

BACKGROUND OF THE INVENTION

The invention relates to an arrangement in a recovery boiler, into which spent liquor to be combusted and combustion air are fed, the arrangement comprising superheaters in the upper part of the recovery boiler for recovering heat.

In a recovery boiler of a pulp mill the black liquor formed during the manufacturing of pulp is combusted such that on one hand heat energy is recovered and on the other hand chemicals are recovered, which can be returned to the process taking place in the pulp mill. Heat is generated in the furnace during combustion and is recovered utilizing walls and other heat transfer surfaces. The heat transfer surfaces are connected together in different ways so that both the recovery boiler and a flue gas duct placed thereafter are provided with different heat transfer surfaces, such as boiler banks and economizers, to allow cold water to heat and further to evaporate and finally the saturated vapour is heated in the superheaters in such a manner that high-pressure vapour is superheated to meet the needs of the pulp mill and to produce electricity.

In modern recovery boilers, superheaters are placed above a so-called nose in the uppermost part of the recovery boiler in a space, through which flue gases flow from the recovery boiler to the flue gas duct. Typical superheaters are elements suspended from the upper parts thereof that comprise vertical tubes, in relation to which the flue gases flow mainly transversely.

As a theoretical starting point it is preferable that the hottest, i.e. the last superheaters in the flow direction of vapour, were placed in the hottest possible flue gases. This is not always possible, for instance owing to corrosion. However, the heat recovery capacity of modern recovery boilers should be improved from the present one and at the same time matters like corrosion should be taken into account.

BRIEF DESCRIPTION OF THE INVENTION

It is an object of the present invention to provide such an arrangement in a recovery boiler, in which the heat recovery capacity of the recovery boiler and especially the power of superheaters are improved, however maintaining the endurance properties of corrosion substantially equal. The arrangement according to the invention is characterized in that below the superheaters in the upper part of the recovery boiler there is provided a substantially horizontal superheater, which is formed of superheater elements formed of substantially horizontal superheater tubes vertically overlapping one another and of transversally parallel superheater elements in the recovery boiler such that substantially all flue gases created in the furnace of the recovery boiler flow through the superheater formed of the substantially horizontal superheater elements.

It is an essential idea of the invention that instead of the previously used screen tubes containing saturated water-steam mixture and moving through the recovery boiler at the nose of the recovery boiler, superheaters containing steam are mounted in order to heat the steam and to cool the flue gas.

In accordance with an embodiment of the invention the superheater formed of the superheater elements operates as what is known as a primary superheater, whereby some of the advantages of the screen tubes are maintained, such as for instance the fact that the temperature of the steam in the tubes is close to the temperature of the saturated steam.

An advantage of the invention is that in this way the heat transfer surface of the superheaters is increased without having to enlarge the so-called superheater region in the uppermost part of the boiler. The invention allows achieving more easily than the current known solutions the high temperature and pressure values of the steam.

BRIEF DESCRIPTION OF THE DRAWINGS

Embodiments of the invention are explained in greater detail in the accompanying drawings, in which FIG. 1 schematically shows a vertical side view in cross-section of a prior art recovery boiler FIG. 2 schematically shows a vertical side view in cross-section of a recovery boiler including an arrangement according to the invention.

DETAILED DESCRIPTION OF THE EMBODIMENTS OF THE INVENTION

Figure 1:
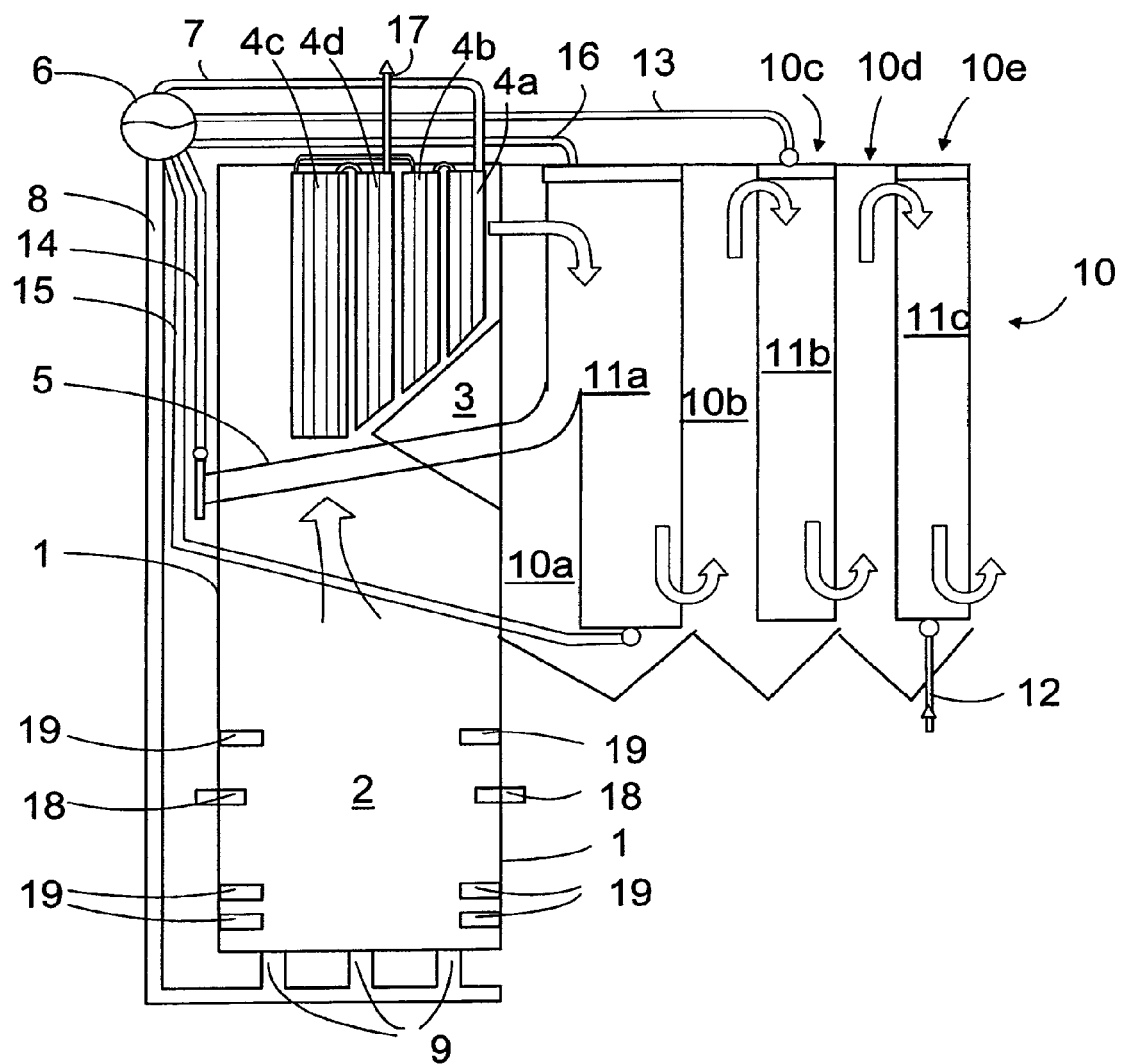
Figure 2:
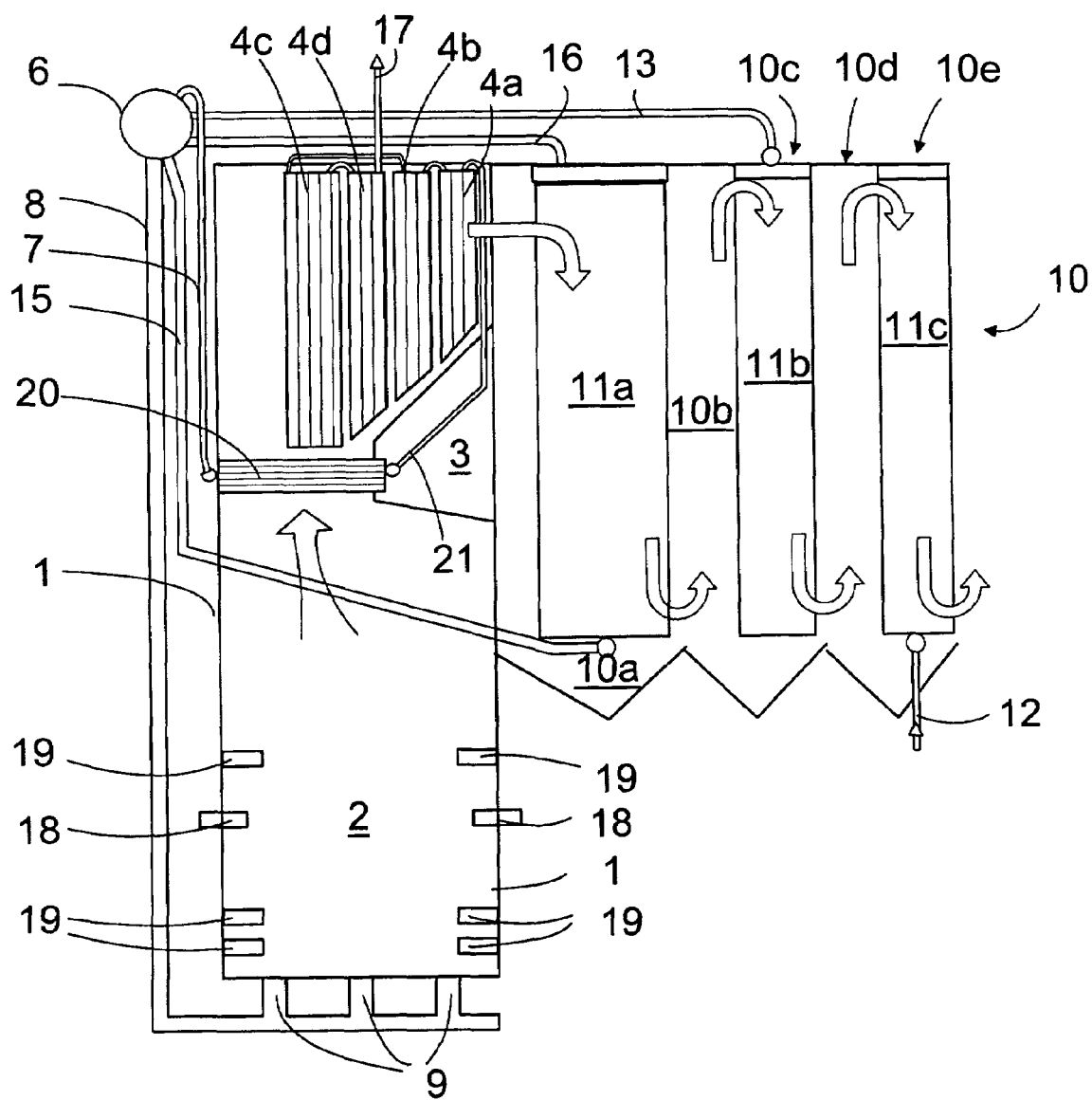

FIGS. 1 and 2 schematically show a vertical side view in cross-section of a recovery boiler. In both Figures the same numerals are used for corresponding components and they will not be specified separately later, if it is not necessary for understanding the solution in question.

The recovery boiler comprises walls 1, which are formed of tubes welded in a manner known per se. A furnace 2 remains inside the walls, and the upper part of the furnace is provided with a nose 3 for appropriately guiding the flue gas flows. Superheaters 4a-4d formed of tubes are placed above the nose 3 in the upper part of the recovery boiler. The superheaters 4a-4d are elements formed of several parallely located vertical tubes. Several such elements are placed in parallel in the transverse direction of the recovery boiler. Steam flows in the superheaters 4a-4d that is heated when hot flue gases heat the tubes from the outside. Currently screen tubes 5 are typically placed below the superheaters 4a-4d at the nose 3. Screen tubes are positioned relatively far apart from one another in the screen tube system 5 and saturated water circulates therein that partly evaporates on the impact of the flue gases flowing past the screen tubes. Correspondingly this causes the temperature of the flue gases to drop before they reach the superheaters. In addition, the screen tubes protect the superheaters 4a-4d from a direct radiation of the furnace.

What is also included in the water and steam system of a recovery boiler is what is known as a cylinder 6 provided with both water and steam. From the cylinder 6 water and correspondingly steam is lead along different tube systems to the tubes forming the walls of the boiler and to the different heat transfer surfaces for heating the water and for superheating the steam.

The saturated steam flows from the cylinder 6 through a saturated steam tube system 7 to a first superheater phase, i.e. a so-called primary superheater. In some cases the number of cylinders 6 may be more than one. Descent tubes 8 lead away from the cylinder 6 to lower circulation pipes 9 in the lower part of the recovery boiler. The walls 1, superheaters 4a-4d and screen tubes 5 of the recovery boiler are known as heat transfer surfaces. These heat transfer surfaces are either provided with tubes situated apart from one another or they are welded to form closed walls, such as the walls 1 of the boiler. Water or steam flows inside the heat transfer surfaces that is heated on the impact of the combustion taking place outside the heat transfer surfaces or on the impact of hot gases.

After the superheater region of the recovery boiler there is provided a flue gas duct 10, which typically comprises heat transfer surfaces formed of elements formed of parallel tubes typically suspended from the upper ends thereof, which typically are referred to as what are known as boiler banks or economizers 11a-11c. The flue gas arriving from the upper part of the recovery boiler flows in the boiler bank 11a from above downwards, from the lower part thereof further to the following duct part 10b, through which the flue gas flows upwards to the duct part 10c and to the economizer 11b placed therein and down from there. Through the duct part 10d the flue gas rises again upwards to the following duct part 10e and to the economizer 11c placed therein, through which the gas flows downwards. The number and placement of the boiler banks and the economizers may vary depending on the implementation and manufacture of the recovery boiler. The economizers allow pre-heating the water to be fed into the recovery boiler with already quite cooled flue gases to improve the heat recovery capacity of the recovery boiler in its entirety. The water required to replace the water discharged as steam from the recovery boiler is typically fed in the flue gas flow to the lower end of the last economizer along a channel 12 and the water flows upwards along the economizer against the flue gas flow. The economizers 11b and 11c are in turn connected in series such that the water partly heated flows from the upper end of the economizer 11b to the lower end of the economizer 11b and again inside the economizer 11b upwards. The water partly heated is guided from the upper end of the economizer 11b to the cylinder 6 along a channel 13.

The structure and use of such boiler banks and economizers 11a-11c and their placement in the flue gas duct 10 as well as the tube systems associated therewith are generally known per se and obvious to those skilled in the art and therefore no detailed description thereof is needed herein. The screen tubes 5 are typically a part of the boiler bank 11a in the first duct part, whereby some of the tubes in the boiler bank 11a are bent and guided to move through the furnace of the recovery boiler at the nose 3. The heated water is led from the cylinder 6 further along tube systems 14 and 15 to the screen tubes 5 and to the lower end of the boiler bank 11a. Obviously the tubes 14 do not pass through the furnace but outside the recovery boiler. From the upper end of the boiler bank 11a the mixture of saturated steam and water flows along a tube system 16 to the cylinder 6.

The saturated steam thus flows from the cylinder 6 along the tube system 7 to a first superheater 4a, i.e. a primary superheater. From here the saturated steam flows further to a second superheater 4b, and further to a third superheater 4c, which is located first in the flow direction of the flue gas, and from there further to a final superheater 4d located between the second and the third superheater, from where it flows along a steam channel 17 out to be used in an appropriate location of the process.

The walls 1 of the recovery boiler are provided with nozzles 18, through which spent liquor formed during the process in the pulp mill, typically black liquor, is fed to the recovery boiler for combustion. The walls of the recovery boiler are also provided with air nozzles 19 for feeding air required for combustion into the recovery boiler. Air may be fed in different ways known per se fro different parts of the recovery boiler. All different tube connections, water and steam circulation in the tube systems and on the heat transfer surfaces as well as the spent waste feed and air feed are generally known per se and obvious solutions to those skilled in the art, and therefore no detailed description thereof is needed herein.

FIG. 2 shows a vertical side view of a recovery boiler in cross-section, in which the solution of the invention is employed. Differing from the implementation shown in FIG. 1 the tubes of the boiler bank 11a located in the first duct part 10a are no longer bent inside the furnace of the recovery boiler, instead they continue as such straight downwards so that the shape and cross-section of the boiler bank 11a located in the first duct part is preferably uniform as to the total length thereof. The screen tubes are replaced with a superheater 20 formed of parallel superheater elements in the transverse direction of the recovery boiler formed of horizontal tubes overlapping one another in the vertical direction.

The superheater 20 is formed of superheater elements and supported from both ends thereof on the structure of the recovery boiler, i.e. for instance on the front wall and correspondingly on the nose 3 in a manner known per se. The superheater 20 may be placed somewhat obliquely in relation to the horizontal direction but is substantially horizontal. The superheater 20 may appropriately operate in the flow direction of steam as the first superheater, what is known as the primary superheater, in which the saturated steam guided to the cylinder in the first stage is superheated, or heated. For this purpose, the tube 7 conducting saturated steam is for instance connected to one end of the superheater 20 and the steam flows superheated out from the opposite end of the superheater 20 through the tube system 21 to the superheater 4a, from where the steam flows as previously shown in FIG. 1 forward and is discharged from the superheaters through the tube system 17.

The low temperature of the steam causes the steam to be in a saturated state or close to it. Also, a result of the low temperature the corrosion of the superheater tubes remains relatively low. In addition, the low temperature causes the fact that the flue gases are cooled appropriately before they arrive at the superheaters 4a-4d placed in the upper end of the recovery boiler, thus reducing their risk of corrosion. Furthermore the superheater 20 protects the superheaters 4a-4d from the straight radiation of the furnace.

The number of elements included in the superheater 20 may vary depending on the case in different ways, but the number thereof has to be such that they are able to provide sufficient heating of steam and cooling of flue gases for the superheaters 4a-4d in the upper part. Since the steam can be superheated during more stages than before and in a heat transfer surface region of the superheaters that is larger than before, it is easier to provide steam of a desired temperature and to increase the overall efficiency of the recovery boiler.

The superheater elements that form the superheater 20 may also be located in the direction of the front wall between the front wall and the nose, whereby they have to be correspondingly supported or fastened from the ends thereof on the side of the side walls. Connecting the superheater by means of tubes to another water and steam system is trivial as such and an obvious solution to those skilled in the art, and therefore need not be explained in greater detail herein.

The invention has above in the description and in the drawings been explained only by way of example but it is not by any means restricted thereto. What is essential is that a superheater formed of elements supported from both ends thereof on the recovery boiler and substantially horizontal formed of substantially horizontal tubes below the normal superheaters in order to superheat the steam.

The invention claimed is:

1. An arrangement in a recovery boiler, into which spent liquor to be combusted and combustion air are fed, the arrangement comprising superheaters in the upper part of the recovery boiler for recovering heat, wherein below the superheaters in the upper part of the recovery boiler there is provided a substantially horizontal superheater, which is formed of superheater elements formed of substantially horizontal superheater tubes vertically overlapping one another and of transversally parallel superheater elements in the recovery boiler such that substantially all flue gases created in the furnace of the recovery boiler flow through the superheater formed of the substantially horizontal superheater elements, wherein the horizontal superheater is arranged to operate as a primary superheater of the recovery boiler.

2. An arrangement as claimed in claim 1, wherein the superheater elements of the superheater are mounted between a nose of the furnace and the front wall transversely in relation to the front wall and supported from the ends thereof on the side of the nose and correspondingly on the side of the front wall.

3. An arrangement as claimed in claim 1, wherein the superheater elements of the superheater are mounted between the nose and the front wall in the direction of the front wall and supported from the ends thereof on the side of the side walls.

* * * * *